(12) United States Patent
Batra et al.

(10) Patent No.: US 8,472,136 B2
(45) Date of Patent: Jun. 25, 2013

(54) WRITE POLE WITH A SYNTHESIZED LOW MAGNETIZATION SHIELD

(75) Inventors: Sharat Batra, Plymouth, MN (US); Michael Mallary, Harmony, PA (US); Mourad Benakli, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 532 days.

(21) Appl. No.: 12/502,149

(22) Filed: Jul. 13, 2009

(65) Prior Publication Data

US 2011/0007428 A1 Jan. 13, 2011

(51) Int. Cl.
*G11B 5/23* (2006.01)
*G11B 5/147* (2006.01)

(52) U.S. Cl.
USPC .................................. 360/119.04; 360/125.3

(58) Field of Classification Search
USPC ............. 360/119.03, 119.01, 119.02, 119.04, 360/125.74, 125.71, 125.3
See application file for complete search history.

(56) References Cited

U.S. PATENT DOCUMENTS

| | | | | |
|---|---|---|---|---|
| 4,667,260 A * | 5/1987 | Perlov et al. | ................... | 360/122 |
| 5,986,856 A * | 11/1999 | Macken et al. | ................ | 360/317 |
| 6,791,796 B2 | 9/2004 | Shukh et al. | | |
| 6,842,313 B1 * | 1/2005 | Mallary | ........................ | 360/319 |
| 6,950,277 B1 | 9/2005 | Nguy et al. | | |
| 6,960,281 B2 | 11/2005 | Han et al. | | |
| 7,042,682 B2 | 5/2006 | Hu et al. | | |
| 7,054,105 B2 * | 5/2006 | Mochizuki et al. | ....... | 360/125.03 |
| 7,106,554 B2 * | 9/2006 | Guan et al. | ................ | 360/125.16 |
| 7,149,045 B1 | 12/2006 | Mallary et al. | | |
| 7,196,871 B2 * | 3/2007 | Hsu et al. | .................. | 360/125.03 |
| 7,221,539 B2 | 5/2007 | Takano et al. | | |
| 7,233,457 B2 | 6/2007 | Johnston et al. | | |
| 7,322,095 B2 | 1/2008 | Guan et al. | | |
| 7,477,481 B2 * | 1/2009 | Guthrie et al. | ........... | 360/119.03 |
| 7,573,683 B1 * | 8/2009 | Benakli et al. | ................. | 360/319 |
| 7,894,159 B2 * | 2/2011 | Lengsfield et al. | ....... | 360/125.03 |
| 7,911,743 B2 * | 3/2011 | Hachisuka et al. | ........... | 360/316 |
| 7,952,831 B2 * | 5/2011 | Kim et al. | ................. | 360/119.03 |
| 8,023,231 B2 * | 9/2011 | Guan et al. | ..................... | 360/319 |
| 2002/0064002 A1 | 5/2002 | Gill | | |
| 2004/0136119 A1 | 7/2004 | Kirschenbaum et al. | | |
| 2004/0201918 A1 | 10/2004 | Guan et al. | | |
| 2004/0252415 A1 | 12/2004 | Shukh et al. | | |
| 2005/0068665 A1 | 3/2005 | Le et al. | | |
| 2005/0068669 A1 | 3/2005 | Hsu et al. | | |
| 2007/0025018 A1 | 2/2007 | Lim et al. | | |
| 2007/0097546 A1 | 5/2007 | Li et al. | | |
| 2008/0239568 A1 * | 10/2008 | Miyatake et al. | ......... | 360/119.03 |
| 2009/0002895 A1 * | 1/2009 | Pust et al. | ..................... | 360/319 |

(Continued)

OTHER PUBLICATIONS

Lijie Guan et al., Media Dependence of Shielded Perpendicular Write Head Design, Headway Technologies/SAE HK Magnetics, May 21, 2007, 1-31.

*Primary Examiner* — Brian Miller
(74) *Attorney, Agent, or Firm* — Hall Estill Attorneys at Law

(57) ABSTRACT

A magnetic writer comprises a write pole and a trailing shield. The write pole is proximate an air bearing surface. The trailing shield is separated from the write pole by a first write gap. The trailing shield is configured with a magnetic layer disposed between the first write gap and a second write gap.

20 Claims, 9 Drawing Sheets

U.S. PATENT DOCUMENTS

| | | |
|---|---|---|
| 2009/0021863 A1 | 1/2009 | Zheng |
| 2009/0262464 A1* | 10/2009 | Gill et al. ............. 360/319 |
| 2010/0053820 A1* | 3/2010 | Miyauchi et al. ............. 360/319 |
| 2010/0103563 A1* | 4/2010 | Machita et al. ............. 360/316 |
| 2011/0007428 A1* | 1/2011 | Batra et al. ............. 360/319 |
| 2011/0242701 A1* | 10/2011 | Ohtake et al. ............. 360/99.08 |

* cited by examiner

WRITE POLE WITH A SYNTHESIZED LOW MAGNETIZATION SHIELD

SUMMARY

A magnetic writer comprises a write pole and a return pole, the write pole proximate an air bearing surface. A trailing shield is separated from the write pole by a first write gap and is configured with a magnetic layer disposed between the first write gap and a second write gap.

DETAILED DESCRIPTION

Figure 1:
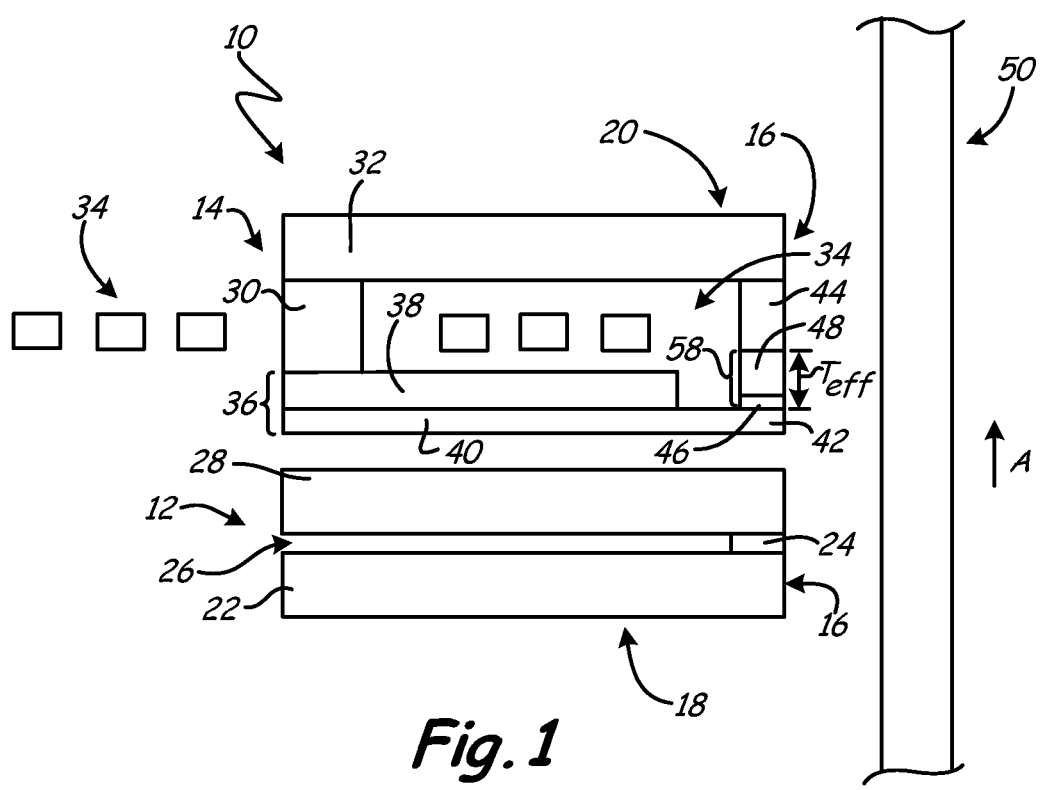
FIG. 1 is a cross-sectional view of a recording head having a first write gap and a synthesized low magnetization shield taken substantially normal to a magnetic medium.

FIG. 1 is a cross-sectional view of an example recording head 10, which includes a reader 12 and writer 14 that define an air bearing surface (ABS) 16. Reader 12 and writer 14 each have an ABS 16, leading edge 18 and trailing edge 20. Reader 12 includes bottom shield structure 22, read element 24, read gap 26, and top shield structure 28. Writer 14 includes magnetic stud 30, return pole 32, conductive coil 34, write pole 36 (having yoke 38, write pole body 40 and write pole tip 42), trailing shield 44, first write gap 46 and synthesized low magnetization shield 48.

Reader 12 and writer 14 are shown merely for purposes of illustrating a construction that may be sued in recording head 10 and variations on that design can be made. For example, writer 14 can have dual return poles instead of the single return pole shown. Writer 14 can also have dual coils.

On reader 12, read gap 26 is defined on the ABS 16 between terminating ends of bottom shield 22 and top shield 28. Read element 24 is positioned in read gap 26 adjacent the ABS 16. Read element 24 may be any variety of different types of read elements, such as a magnetoresistive (MR) element, a tunneling magnetoresistive (TMR) read element or a giant magnetoresistive (GMR) read element.

Recording head 10 confronts magnetic medium 50 at the ABS. Magnetic medium 50 is positioned proximate to recording head 10. Reader 12 and writer 14 are carried over the surface of magnetic medium 50, which is moved relative to recording head 10 as indicated by arrow A such that write pole 36 trails reader 12 and leads return pole 32.

Reader 12 reads data from magnetic medium 50. In operation, magnetic flux from a surface of magnetic medium 50 causes rotation of a magnetization vector of read element 24, which in turn causes a change in electrical resistivity of read element 24. The change in resistivity of read element 24 can be detected by passing a current through read element 24 and measuring a voltage across read element 24. Shields 22 and 28, which may be made of a soft ferromagnetic material, guide stray magnetic flux away from read element 24.

Write pole 36 is used to physically write data to magnetic medium 50. Conductive coil 34 surrounds magnetic stud 30, which magnetically couples write pole 36 to return pole 32. Conductive coil 34 passes through the gap between write pole 36 and return pole 32. Return pole 32 and magnetic stud 30 can comprise soft magnetic materials, such as NiFe; conductive coil 34 can comprise a material with low electrical resistance, such as Cu; and write pole body 40 can comprise a high moment soft magnetic material, such as CoFe.

In order to write data, current is caused to flow through conductive coil 34. The magnetomotive force in coil 34 causes magnetic flux from write pole tip 42 to travel through a closed magnetic flux path created by magnetic medium 50, return pole 32 and magnetic stud 30. The direction of the write field at medium confronting surface 16 of write pole tip 42 is controllable based on the direction the current flows through conductive coil 34. The direction of the write field is related to the polarity of the data written to magnetic medium 50.

Trailing shield 44 is positioned at leading edge 18 of return pole 32, and is spaced apart from trailing edge 20 of write pole tip 42 by first write gap 46 and synthesized low magnetization shield 48. Trailing shield 44 comprises a magnetic material. Trailing shield 44 forces flux from write pole 36 to return over a shorter path, which boosts the field gradient and writes sharper transitions on medium 50. The field gradient can be further improved by positioning trailing shield 44 closer to write pole 36. However, flux from write pole 36 increasingly prefers trailing shield 44 with decreasing distance between write pole 36 and trailing shield 44. If trailing shield 44 is too close to write pole 36, flux will leak from pole tip 42 to trailing shield 44 and reduce the write field. Further, positioning trailing shield 44 closer to write pole 36 will also increase the negative peak of the field gradient and increase the risk of erasure, especially down-track, due to the high negative field gradient.

Effective gap 58 separates write pole tip 42 from trailing shield 44 and has effective thickness $T_{eff}$. First write gap 46 and synthesized low magnetization shield 48 are positioned in effective gap 58. First write gap 46 is a non-magnetic or a weakly magnetic material having a low relative permeability, such as between about 1 and about 10, where relative permeability is calculated by dividing the permeability of the material of interest by the permeability of air. Relative permeability is a dimensionless number. In one example, first write gap 46 comprises an alumina, ruthenium, or tantalum alloy or a mixture thereof.

Synthesized low magnetization shield 48 has a low effective magnetic saturation value, where the effective magnetic saturation value is the average of the local magnetic saturation values along synthesized low magnetization shield 48. In one example, synthesized low magnetization shield 48 has an effective magnetic saturation value of less than 1.0 tesla, such as 0.9 tesla or less, 0.8 tesla or less or 0.7 tesla or less. The magnetic saturation value of synthesized low magnetization shield 48 varies over the thickness of synthesized low magnetization shield 48. For example, synthesized low magnetization shield 48 can have a low effective magnetic saturation value, while the local magnetic saturation value at a specific location on synthesized low magnetization shield 48 can be higher, such as greater than 1.0 tesla, than the effective magnetic saturation value. In one example, synthesized low magnetization shield 48 comprises a shim having a high magnetization saturation value separated from trailing shield 44 by a write gap having a low magnetization saturation value (i.e. FIGS. 2-4). In another example, synthesized low magnetization shield 48 comprises a plurality of shims separated by write gaps (i.e. FIGS. 5-7). In a further example, synthesized low magnetization shield 48 comprises a graded or saturatable magnetization material (i.e. FIGS. 8-10). In a yet further example, synthesized low magnetization shield 48 comprises a high magnetization portion at the leading edge and the remaining thickness of synthesized low magnetization shield 48 comprises a graded or saturatable magnetization material (i.e. FIGS. 11-13).

As described above, to write information to magnetic medium 50, a current flows through coil 34, which induces a magnetic field in write pole tip 42. The magnetic flux generally travels from write pole tip 42, across magnetic medium 50 and through return pole 32 and magnetic stud 30 to form a closed path. The write process begins at about 70% of the peak effective field and is complete about 5 nanometers down-track from this location. The area over which the writing takes place is referred to as the write window. A high gradient is necessary throughout the write window to enable writing to magnetic medium 50. Once down-track of the write window, however, the high gradient is no longer necessary. Producing high gradient down-track of the write window does not assist in the write process. Instead, producing high gradient down-track of the write window draws flux from write pole tip 42, and degrades the peak field achievable. Writer 14 achieves a higher write field by not producing a high gradient down-track of the write window.

Synthesized low magnetization shield 48 enables the magnetic field profile of writer 14 to be modified so that a high field gradient is produced through the write window and a lower field gradient is produced down-track of the write window. Writer 14 has the same or improved writing capabilities compared to writers having a high field gradient down-track of the write window. However, it is easier to achieve a high write field with writer 14 because less flux is drawn from write pole tip 42 in an effort to produce high field gradient down-track of the write window.

Writer 14 is configured to increase the magnetic gradient without sacrificing the write field. In order to increase the magnetic gradient, the magnetization of synthesized low magnetization shield 48 has a perpendicular component that is in an opposite direction to the magnetization of pole tip 42 during a write process. In one example, the magnetization of synthesized low magnetization shield 48 is at about −10 degrees to about −90 degrees to the magnetization of pole tip 42. In another example, the magnetization of synthesized low magnetization shield 48 is at about −20 degrees to about −90 degrees to the magnetization of pole tip 42. Orienting the magnetization of synthesized low magnetization shield 48 substantially parallel to medium 50, such that the magnetization of synthesized low magnetization shield 48 does not have a substantial perpendicular component, would decrease the risk of erasure but would not increase the magnetic gradient.

Writer 14 can also be discussed in terms of magnetic potential. Pole tip 42 has a positive magnetic potential, and synthesized low magnetization shield 48 has a negative magnetic potential. Synthesized low magnetization shield 48 is configured such that the magnetic potential of synthesized low magnetization shield 48 at medium confronting surface 16 has a lower value than the mean value between the magnetic potential at medium confronting surface 16 of write pole tip 42 and the magnetic potential at medium confronting surface 16 of leading edge 18 of trailing shield 44.

The process of switching the magnetism of magnetic medium 50 using writer 14 is not solely achieved by a perpendicular magnetic field (i.e. a magnetic field perpendicular to magnetic medium 50). A parallel magnetic field from writer 14 also assists in the switching process. An effective field takes into account the perpendicular and parallel magnetic fields. The effective field for Stoner-Wolfarth particles in a magnetic medium is defined by Equation (1), $$H_{eff} = (H_{parallel}^{2/3} + H_{perpendicular}^{2/3})^{3/2} \quad (1)$$

where $H_{eff}$ is the effective field, $H_{parallel}$ is the parallel field and $H_{perpendicular}$ is the perpendicular field. Writer 14 produces a larger parallel magnetic field than a recording head without synthesized low magnetization shield 48. The larger parallel magnetic field of writer 14 compensates for perpendicular magnetic field that may be lost due to flux leakage across first write gap 46 and assists in maintaining an adequate effective field gradient.

Positioning a magnetic material, such as trailing shield 44, close to write pole tip 42 produces a negative peak in the effective field profile and boosts the field gradient. However, producing too negative of a negative peak increases the risk of down-track erasure. Synthesized low magnetization shield 48 reduces the risk of erasure by controlling the negative peak in the effective field profile. The composition and configuration of synthesized low magnetization shield 48 can be adjusted to distribute flux from write pole tip 42 between synthesized low magnetization shield 48 and trailing shield 44 so that the effective field profile contains two negative peaks. Each negative peak of the effective field profile has a less negative value than the single negative peak of a writer without synthesized low magnetization shield 48 with the same gradient. Thus, synthesized low magnetization shield 48 has a reduced risk of down-track erasure while producing a high field gradient.

Figure 2:
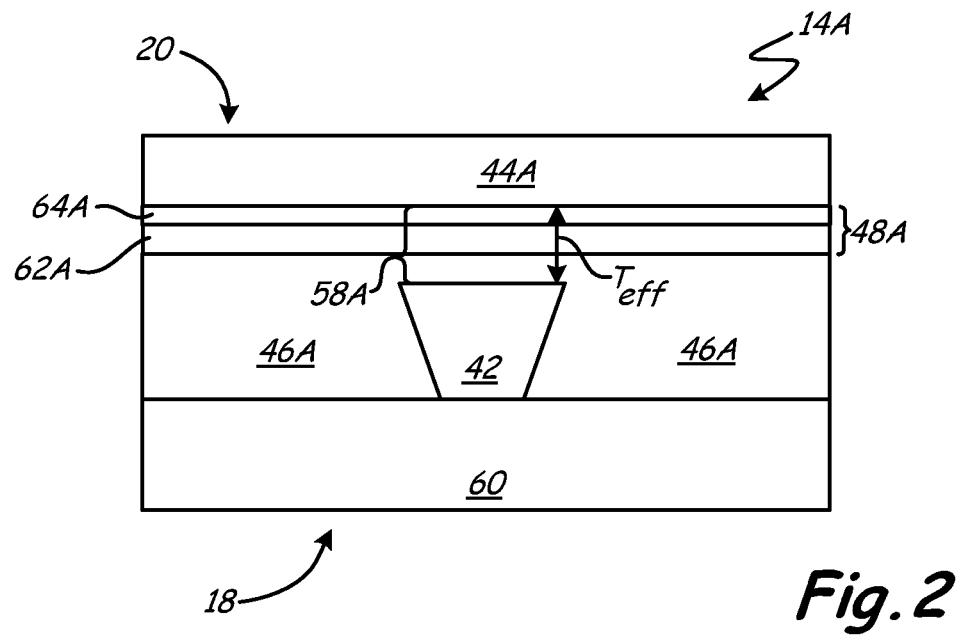
FIG. 2 is a medium facing surface view of a shielded write pole having a synthesized low magnetization shield comprising a first shim and a second write gap.
Figure 3:
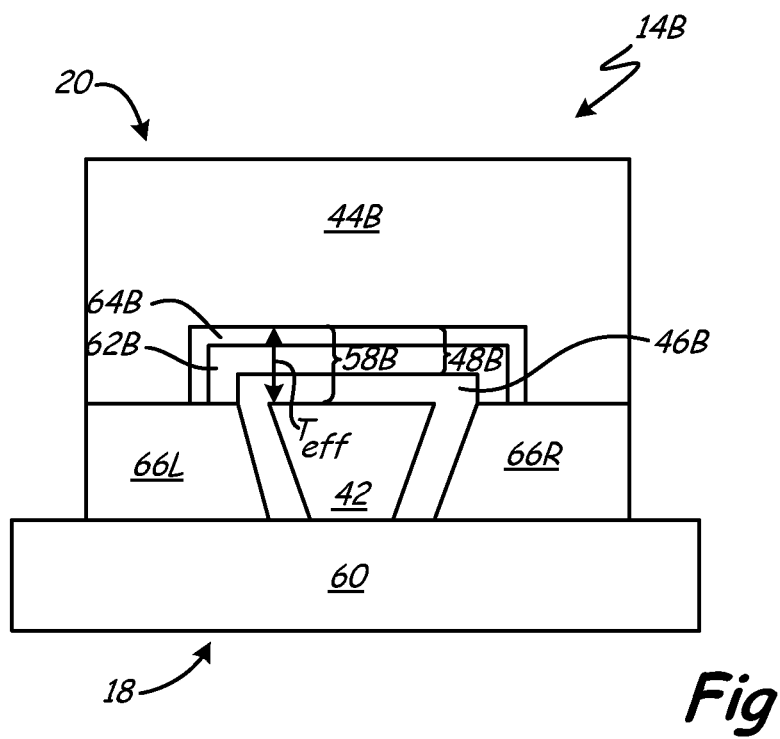
FIG. 3 is a medium facing surface view of a side-shielded write pole having a synthesized low magnetization shield comprising a first shim and a second write gap.
Figure 4:
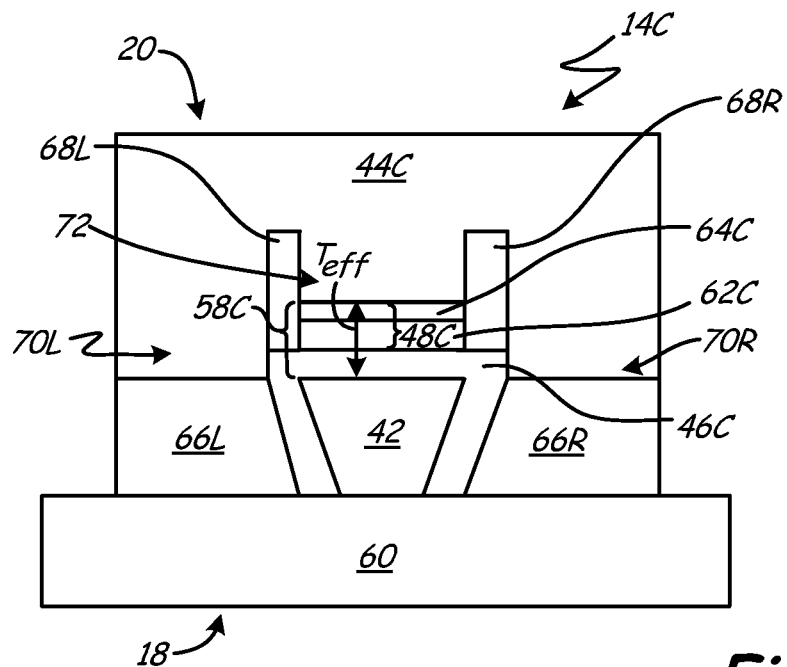
FIG. 4 is a medium facing surface view of a notched write pole having a synthesized low magnetization shield comprising a first shim and a second write gap.
Figure 5:
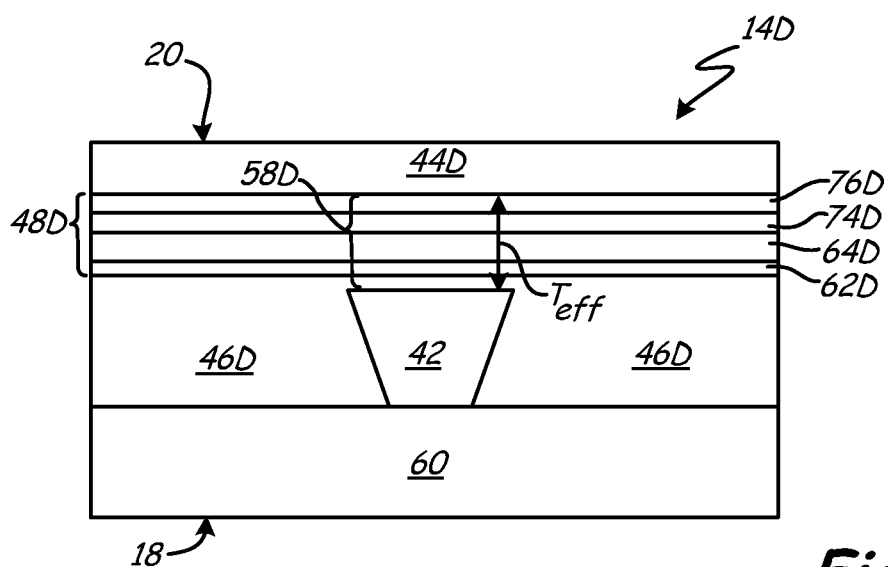
FIG. 5 is a medium facing surface view of a shielded write pole having a synthesized low magnetization shield comprising a first shim, a second write gap, a second shim and a third write gap.
Figure 6:
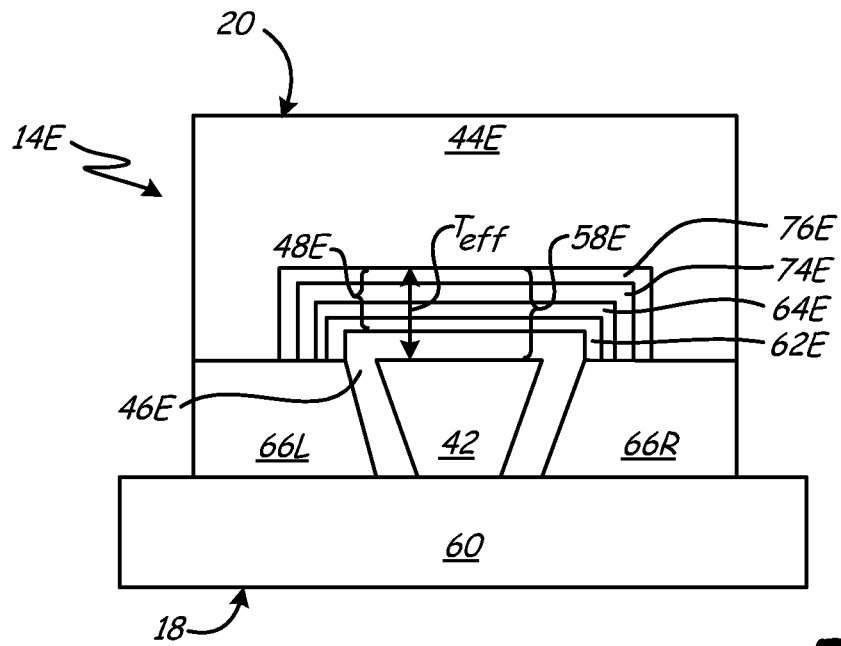
FIG. 6 is a medium facing surface view of a side-shielded write pole having a synthesized low magnetization shield comprising a first shim, a second write gap, a second shim and a third write gap.
Figure 7:
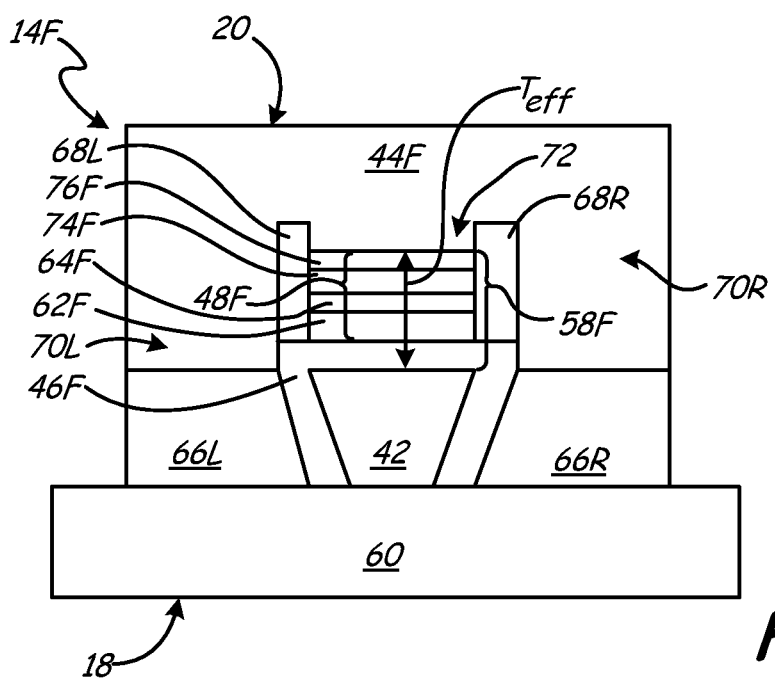
FIG. 7 is a medium facing surface view of a notched write pole having a synthesized low magnetization shield comprising a first shim, a second write gap, a second shim and a third write gap.

As discussed above, synthesized low magnetization shield 48 can have several different configurations. FIGS. 2-4 illustrate various embodiments of recording heads having a high magnetization portion or shim separated from trailing shield 44 by a low magnetization portion or write gap; FIGS. 5-7 illustrate various embodiments of synthesized low magnetization shield 48 having a plurality of high magnetization portions or shims separated by low magnetization portions or write gaps; and FIGS. 8-13 illustrate various embodiments of synthesized low magnetization shield 48 having a graded or saturatable magnetization material.

FIG. 2 is an enlarged medium facing surface view of the writer 14A of FIG. 1 having a shielded pole configuration. A medium facing surface view means the view of the writer taken from the perspective of medium 50. Writer 14A includes substrate 60, pole tip 42, first write gap 46A, trailing shield 44A, synthesized low magnetization shield 48A and effective gap 58A. Substrate 60 is located at leading edge 18 of write pole tip 42; first write gap 46A, first shim 62A and second write gap 64A are positioned between leading edge 18 of trailing shield 44A and trailing edge 20 of write pole tip 42. Substrate 60 represents the features, such as reader 12, that write pole tip 42 is positioned above.

As illustrated in FIG. 2, write pole tip 42 can be fabricated to have a trapezoidal or tapered shape when viewed from the perspective of magnetic medium 50. This trapezoidal shape prevents adjacent track writing problems associated with skew, which occurs when write pole tip 42 is positioned at an angle relative to magnetic medium 50 and portions of write pole tip 42 are outside of the desired track.

In the shielded pole design, trailing shield 44A is spaced apart from trailing edge 20 of write pole tip 42. Trailing shield 44A comprises a magnetic material such as nickel, iron or cobalt or mixtures thereof and enables write pole tip 42 to write sharper magnetic transitions on magnetic medium 50.

First write gap 46A is located on either side of write pole tip 42 and separates trailing edge 20 of write pole tip 42 from synthesized low magnetization shield 48A and trailing shield 44A. First write gap 46A insulates write pole tip 42. First write gap 46A comprises a non-magnetic or weakly magnetic material, such as a material having a relative permeability less than or equal to about 10.

Effective gap 58A having effective thickness $T_{eff}$ is formed between trailing edge 20 of write pole tip 42 and leading edge 18 of trailing shield 44A. In one example, effective thickness $T_{eff}$ is less than about 70 nm. In another example effective thickness $T_{eff}$ is less than about 60 nm. First write gap 46A and synthesized low magnetization shield 48A are located in effective gap 58A.

Synthesized low magnetization shield 48A is positioned between first write gap 46A and trailing shield 44A. In one example, synthesized low magnetization shield 48A has a thickness of about 40 nanometers or less. Synthesized low magnetization shield 48A includes first shim 62A and second write gap 64A. First shim 62A and second write gap 64A have the same width as trailing shield 44A. First shim 62A comprises a magnetic material such as an alloy of nickel, iron or cobalt or a mixture thereof, and has a relative permeability greater than the relative permeability of first write gap 46A. In one example, first shim 62A has a relative permeability greater than about 100. The thickness of first shim 62A can be adjusted as explained below. In one example, first shim 62A has a thickness of about 20 nanometers or less, such as between about 15 nanometers and about 20 nanometers.

Second write gap 64A is an insulating material such as a non-magnetic or weakly magnetic material. Second write gap 64A has a relative permeability less than first shim 62A. In one example, second write gap 64A has a relative permeability less than or equal to about 10. The thickness of second write gap 64A can also be adjusted. In one example, second write gap 64A has a thickness less than or equal to about 15 nanometers.

The thickness and composition of first write gap 46A, first shim 62A and second write gap 64A can be adjusted to reshape the potential distribution between synthesized low magnetization shield 48A and trailing shield 44A and to distribute the flux from write pole tip 42 between synthesized low magnetization shield 48A and trailing shield 44A. One method for distributing the flux between synthesized low magnetization shield 48A and trailing shield 44A is to make the thickness of first shim 62A much smaller than effective thickness $T_{eff}$ of effective gap 58. In one example, the thickness of first shim 62 is less than about 70%, 60%, 50%, 40% or 30% of effective thickness $T_{eff}$ of effective gap 58A. Additionally, the relative permeability of first write gap 46A, first shim 62A and second write gap 64A can also be adjusted to reshape the potential distribution.

The magnetization of first shim 62A and second write gap 64A average so that synthesized low magnetization shield 48A has an effective magnetic saturation value equal to the average magnetic saturation value of first shim 62A and second write gap 64A. In one example, synthesized low magnetization shield 48A has an effective magnetic saturation value of less than 1.0 tesla, such as 0.9 tesla or less, 0.8 tesla or less or 0.7 tesla or less. The low effective magnetic saturation value of synthesized low magnetization shield 48A prevents creating too negative of a magnetic field gradient and decreases the risk of erasure. The low effective magnetic saturation value also results in at most only a small flux leakage from write pole tip 42 while maintaining the effective field. Further, the low effective magnetic saturation value of synthesized low magnetization shield 48A allows shield 48A to be positioned closer to write pole tip 42 without causing a large amount of flux to leak.

First shim 62A and second write gap 64A provide a means to alter the effective field profile of writer 14A. Because of first shim 62A and second write gap 64A, effective gap 58A acts as if it is two individual regions: a first region formed between write pole tip 42 and trailing edge 20 of first shim 62A, which has a high field gradient; and a second region formed between leading edge 18 of second write gap 64A and trailing shield 44A, which has a lower field gradient. As configured, writer 14A has an initially high effective field gradient that begins to decrease down-track of the write window. In one example, the effective field gradient is the Stoner-Walfarth field gradient. The effective field gradient profile of writer 14A can be adjusted by changing the thickness and composition of first shim 62A and second write gap 64A. In one example, synthesized low magnetization shield 48A is configured so that the effective field gradient or the Stoner-Walfarth field gradient decreases at a field value of between about 70% and about 60% of the field maximum. In another example, synthesized low magnetization shield 48A is configured so that the effective field gradient or the Stoner-Walfarth field gradient decreases at a field value of between about 60% and about 50% of the field maximum. In a further example, synthesized low magnetization shield 48A is configured so that the effective field gradient or the Stoner-Walfarth field gradient decreases at a field value of between about 50% and about 40% of the field maximum. Decreasing the effective field gradient down-track of the write window reduces the amount of flux drawn from write pole tip 42 used to produce a high field gradient down-track of the write window.

First shim 62A, located between first write gap 46A and second write gap 64A, allows the potential distribution in synthesized low magnetization shield 48A and trailing shield 44A to be reshaped in order to redistribute the field in shield 48A and shield 44A. This configuration produces a large field gradient while minimizing field loss and reducing the risk of erasure. First shim 62A can be used with a variety of different write pole designs, such as a shielded write pole (FIG. 2), a shielded write pole with side shields (FIG. 3) and a shielded notched write pole (FIG. 4).

FIG. 3 is an enlarged medium facing surface view of an example writer 14B having side shields 66R, 66L. Writer 14B includes substrate 60, write pole tip 42, first and second side shields 66L and 66R, respectively, first write gap 46B, synthesized low magnetization shield 48B (having first shim 62B and second write gap 64B) and trailing shield 44B. Substrate 60 is at leading edge 18 of write pole tip 42; first write gap 46B, first shim 62B and second write gap 64B are positioned between trailing edge 20 of write pole tip 42 and leading edge 18 of trailing shield 44B; and first and second side shields 66L and 66R, respectively, are located on either side of write pole tip 42. Substrate 60 and pole tip 42 have been described above. First write gap 46B surrounds write pole tip 42 on either side and at trailing edge 20.

First and second side shields 66L and 66R (referred to generally as side shields 66) extend from substrate 60. Side shields 66 extend along substantially the entire thickness of write pole tip 42 and include a magnetic material. In one example, first and second side shields 66L and 66R comprise an alloy of nickel, iron or cobalt or a mixture thereof. In another example, the thickness of side shields 66 is about equal to the thickness of write pole tip 42 so that trailing edges 20 of shields 66 are in the same horizontal plane as trailing edge 20 of write pole tip 42. Side shields 66 decrease adjacent track interference (ATI), improve field confinement and increase the write field gradient, thereby enabling higher track density. For example, unwanted side writing can occur due to a change in skew angle as recording head 10 travels in an arc across the magnetic medium. Side writing can cause ATI, which results in off-track erasure of transitions recorded on the magnetic medium. Side shields 66 reduce the erase band and improve tracks per inch (TPI).

Effective gap 58B is formed between the trailing edge of write pole tip 42 and the leading edge of trailing shield 44B. Effective gap 58B has effective thickness $T_{eff}$. First write gap 46B and synthesized low magnetization shield 48B are located in effective gap 58B.

First write gap 46B extends from substrate 60 along either side of write pole tip 42 to insulate write pole tip 42 from first and second side shields 66L and 66R. First write gap 46B also covers write pole tip 42 at trailing edge 20 to insulate write pole tip 42 from synthesized low magnetization shield 48B and trailing shield 44B. First write gap 46B comprises an insulating material. For example, first write gap 46B can comprise a non-magnetic material or a weakly magnetic material having a low relative permeability, such as a relative permeability between about 1 and about 10.

Synthesized low magnetization shield 48B is positioned in effective gap 62B between trailing edge 20 of first write gap 46B and leading edge 18 of trailing shield 44B, and includes first shim 62B and second write gap 64B. First shim 62B is located between first write gap 46B and second write gap 64B. First shim 62B has a flat-bottom U-shape, such that first shim 62B extends from first and second side shields 66L and 66R and wraps around trailing edge 20 of write pole tip 42. As shown in FIG. 3, first shim 62B contacts first write gap 46B on either side of write pole tip 42 and at trailing edge 20. First shim 62B comprises a magnetic material, such as an alloy of nickel, iron or cobalt or a mixture thereof, and has a high relative permeability, such as a relative permeability greater than about 100.

Second write gap 64B is positioned between trailing edge 20 of first shim 62B and leading edge 18 of trailing shield 44B. Second write gap 64B separates trailing shield 44B from first shim 62B. As shown in FIG. 3, second write gap 64B can extend from first and second side shields 66L and 66R such that second write gap 64B has a shape similar to first shim 62B. Second write gap 64B comprises a non-magnetic or weakly magnetic material. In one example, second write gap 64B has a low relative permeability, such as a relative permeability less than about 10.

Trailing shield 44B is positioned at trailing edge 20 of second write gap 64B. Trailing shield 44B comprises a high moment magnetic material, such as nickel, iron or cobalt or mixtures thereof. Similar to first shim 62B and second write gap 64B, trailing shield 44B extends from first and second side shields 66L and 66R and has a flat-bottom U-shape.

Similar to writer 14A of FIG. 2, flux from write pole tip 42 in writer 14B is distributed between synthesized low magnetization shield 48B and trailing shield 44B. The thickness and composition of first shim 62A and second write gap 64B are adjusted to redistribute the fields and reshape the potential distribution in synthesized low magnetization shield 48B and trailing shield 44B. In one example, first shim 62B has a small thickness compared to effective thickness $T_{eff}$ of effective gap 58B (i.e. first shim 62B is thinner than effective thickness $T_{eff}$). In another example, the thickness of first shim 62B is less than about 70%, 60%, 50%, 40% or 30% of effective thickness $T_{eff}$ of effective gap 58B.

Flux leakage from write pole tip 42 is reduced because synthesized low magnetization shield 48B has a low effective magnetic saturation value. In one example, synthesized low magnetization shield 48B has an effective magnetic saturation value of less than 1.0 tesla, such as 0.9 tesla or less, 0.8 tesla or less or 0.7 tesla or less. The low effective magnetic saturation value further enables a higher field gradient and reduces second track erasure (STE). Any ferromagnetic material, including synthesized low magnetization shield 48B, contains domain patterns having domain walls. At the microscopic level, a strong magnetic field emanates from a domain wall and causes STE. Synthesized low magnetization shield 48B reduces or eliminates STE because the magnetization fields emanating from the domain walls are reduced.

Synthesized low magnetization shield 48B is configured so that the effective field gradient, such as the Stoner-Walfarth field gradient, is high when transitions are written and decreases down-track of the write window. In one example, synthesized low magnetization shield 48B is configured so that the effective field gradient or the Stoner-Walfarth field gradient decreases at a field value of between about 70% and about 60%, between about 60% and about 50% or between about 50% and about 40% of the maximum field value. Decreasing the effective field gradient down-track of the write window reduces the flux drawn from write pole tip 42 which is used to increase the peak field.

FIG. 4 is an enlarged medium facing surface view of example writer 14C having a notch configuration. Writer 14C includes substrate 60, write pole tip 42, first and second side shields 66L and 66R, first write gap 46C, synthesized low magnetization shield 48C notched trailing shield 44C and first and second notches 68L and 68R, respectively. Synthesized low magnetization shield 48C includes first shim 62C and second write gap 64C. Notched trailing shield 44C includes first and second trailing shield sides 70L and 70R, respectively, and tongue 72.

Substrate 60 is at leading edge 18 of write pole tip 42; synthesized low magnetization shield 48C and notched trailing shield 44C are proximate trailing edge 20 of write pole tip 42; and first write gap 46C and side shields 66L and 66R are at either side of write pole tip 42. Substrate 60 represents the components, such as reader 12, on which writer 14C is formed. First and second side shields 66L and 66R extend from substrate 60 on either side of write pole tip 42. First and second side shields 66L and 66R comprise a magnetic material and extend substantially along the sides of write pole tip 42.

Notched trailing shield 44C is proximate trailing edge 20 of write pole tip 42 and includes first and second trailing shield sides 70L and 70R and tongue 72. In one example, tongue 72 has a width about equal the width of write pole tip 42. In another example, tongue 72 has a width larger than the width of write pole tip 42. In a further example, tongue 72 has a width up to about 50% smaller than the width of write pole tip 42. First and second trailing shield sides 70L and 70R extend from trailing edge 20 of first and second side shields 66L and 66R, respectively. First and second trailing shield sides 70L and 70R have a width about equal to the width of trailing edges 20 of first and second side shields 66L and 66R, respectively. Notched trailing shield 44C comprises a high moment magnetic material, such as nickel, iron or cobalt or mixtures thereof. Notched trailing shield 44C minimizes the curvature of the magnetic transition written on magnetic medium 50 by more clearly defining the track edges.

First notch 68L separates first trailing shield side 70L from tongue 72. Similarly, second notch 68R separates second trailing shield side 70R from tongue 72. First and second notches 68L and 68R comprise an insulating material. In one example, first and second notches 68L and 68R have the same composition as first write gap 46C.

Effective gap 58C is formed between trailing edge 20 of write pole tip 42 and leading edge 18 of notched trailing shield 44C. Effective gap 58C has effective thickness $T_{eff}$. First write gap 46C and synthesized low magnetization shield 48C are positioned in effective gap 58C. First write gap 46C comprises an insulating material and insulates the sides of write pole tip 42 from first and second side shields 66L and 66R. First write gap 46C also insulates the trailing edge of write pole tip 42 from synthesized low magnetization shield 48C.

Synthesized low magnetization shield 48C is positioned at trailing edge 20 of first write gap 46C. First and second notches 68L and 68R insulated synthesized low magnetization shield 48C from first and second trailing shield sides 70L and 70R.

Synthesized low magnetization shield 48C includes, in order from trailing edge 20 of first write gap 46C, first shim 62C and second write gap 64C. First shim 62C is at leading edge 18 of synthesized low magnetization shield 48C and comprises a magnetic material. First shim 62C has a high relative permeability, such as about 100 or greater. Second write gap 64C is between first shim 62C and trailing shield 44C. Second write gap 64C comprises a non-magnetic material or a weakly magnetic material, such as a material having a relative permeability between about 1 and 10.

As described above with respect to FIG. 2, the thickness and composition of first shim 62C and second write gap 64C provide a means to reshape the potential distribution and redistribute the field in synthesized low magnetization shield 48C and trailing shield 44C. First shim 62C has a small thickness compared to effective thickness $T_{eff}$ of effective gap 58C. In one example, first shim 62C is less than about 70%, 60%, 50%, 40% or 30% of effective thickness $T_{eff}$ of effective gap 58C.

Additionally, synthesized low magnetization shield 48C has an effective magnetic saturation value equal to the average magnetic saturation values of first shim 62C and second write gap 64C. Synthesized low magnetization shield 48C has a low effective magnetic saturation value. In one example, synthesized low magnetization shield 48C has an effective magnetic saturation value of less than 1.0 tesla, such as 0.9 tesla or less, 0.8 tesla or less or 0.7 tesla or less.

Synthesized low magnetization shield 48C is configured so that the effective field gradient, such as the Stoner-Walfarth field gradient, is high when a magnetic transition is written to magnetic medium 50 and the effective field gradient is low down-track of the write window. This configuration increases the peak field achievable. In one example, synthesized low magnetization shield 48C is configured so that the effective field gradient decreases at a field value of between about 70% and about 60%, about 60% to about 50% or about 50% to 40% of the field maximum. Decreasing the effective field gradient down-track of the write window reduces the amount of flux drawn from write pole tip 42.

Regardless of the configuration of writer 14, synthesized low magnetization shield 48A, 48B, 48C (referred to generally synthesized low magnetization shield 48) having first shim 62A, 62B, 62C (referred to generally as first shim 62) and second write gap 64A, 64B, 64C (referred to generally as second write gap 64) is configured to provide a high field gradient through the write window and a low field gradient down-track of the write window. First shim 62 and second write gap 64 enable higher on-track field values to be maintained compared to a writer having only first write gap 46 between write pole tip 42 and trailing shield 44. Because of second write gap 64, first write gap 46 can have a smaller thickness, thereby significantly improving the field gradient over the range of media coercivity without increasing on-track field loss.

In an alternative embodiment, synthesized low magnetization shield 48 includes a plurality of shims that are insulated from one another by insulating write gaps. FIG. 5 is an enlarged medium facing surface view of example shielded writer 14D having synthesized low magnetization shield 48D. Writer 14D includes substrate 60, write pole tip 42, first write gap 46D, trailing shield 44D, synthesized low magnetization shield 48D and effective gap 58D. Substrate 60, write pole tip 42, first write gap 46D and trailing shield 44D are similar to those described above with respect to FIG. 2.

Effective gap 58D is formed between trailing edge 20 of write pole tip 42 and leading edge 18 of trailing shield 44D. Effective gap 58D has effective thickness $T_{eff}$. First write gap 46D and synthesized low magnetization shield 48D are positioned in effective gap 58D.

Synthesized low magnetization shield 48D includes first shim 62D, second write gap 64D, second shim 74D and third write gap 76D. First shim 62D is at leading edge 18 of synthesized low magnetization shield 48D. Second write gap 64D is positioned between first shim 62D and second shim 74D. Third write gap 76D is positioned between second shim 74D and trailing shield 44D.

First shim 62D and second shim 74D contain a magnetic material, such as an alloy of nickel, iron or cobalt or a mixture thereof. First shim 62D and second shim 74D each have a high relative permeability, such as about 100 or greater. In one example, second shim 74D has a lower relative permeability than first shim 62D.

Third write gap 76D and second write gap 64D contains an insulating material. Second write gap 64D and third write gap 76D each have a low relative permeability, such as between about 1 and 10.

First shim 62D, second write gap 64D, second shim 74D and third write gap 76D form synthesized low magnetization shield 48D. Synthesized low magnetization shield 48D is configured so that the flux is distributed between synthesized low magnetization shield 48D and trailing shield 44D. Synthesized low magnetization shield 48D functions similar to synthesized low magnetization shield 48A of FIG. 2, except second shim 74D and third write gap 76D provide additional means to reshape the potential distribution and redistribute the field between synthesized low magnetization shield 48D and trailing shield 44D. For example, first shim 62D can have a small thickness compared to effective thickness $T_{eff}$ of effective gap 58D. In one example, first shim 62D is less than about 70%, 60%, 50%, 40% or 30% of effective thickness $T_{eff}$ of effective gap 58D.

Further, synthesized low magnetization shield 48D has a low effective magnetic saturation value, where effective magnetic saturation value equals the average of the magnetic saturation values of first shim 62D, second write gap 64D, second shim 74D and third write gap 76D. In one example, synthesized low magnetization shield 48D has an effective magnetic saturation value of less than 1.0 tesla, such as 0.9 tesla or less, 0.8 tesla or less or 0.7 tesla or less. The low effective magnetic saturation value of synthesized low magnetization shield 48D reduces flux leakage from write pole tip 42.

The effective field gradient, such as the Stoner-Walfarth field gradient, of writer 14D is high when transitions are written and is low down-track of the write window. In one example, synthesized low magnetization shield 48D is configured so that the effective field gradient decreases at a field value of between about 70% and about 60% of the field maximum. In another example, synthesized low magnetization shield 48D is configured so that the effective field gradient decreases at a field value of between about 60% and about 50% of the field maximum. In a further example, synthesized low magnetization shield 48D is configured so that the effective field gradient decreases at a field value of between about 50% and about 40% of the field maximum. Decreasing the effective field gradient down-track of the write window reduces the amount of flux drawn from write pole tip 42. In an alternative embodiment, third write gap 76D may not be present so that second shim 74D is positioned at leading edge 18 of trailing shield 44D. In a further embodiment, synthesized low magnetization shield 48D includes a plurality of second shims 74D separated from one another by third write gaps 76D.

FIG. 6 illustrates side-shielded writer 14E having synthesized low magnetization shield 48E with second shim 74E and third write gap 76E as viewed from the perspective of magnetic medium 50. FIG. 7 illustrates notched writer 14F having synthesized low magnetization shield 48F with second shim 74F and third write gap 76F as viewed from the perspective of magnetic medium 50. Shields 48E and 48F are similar to synthesized low magnetization shield 48D of FIG. 5.

Figure 8:
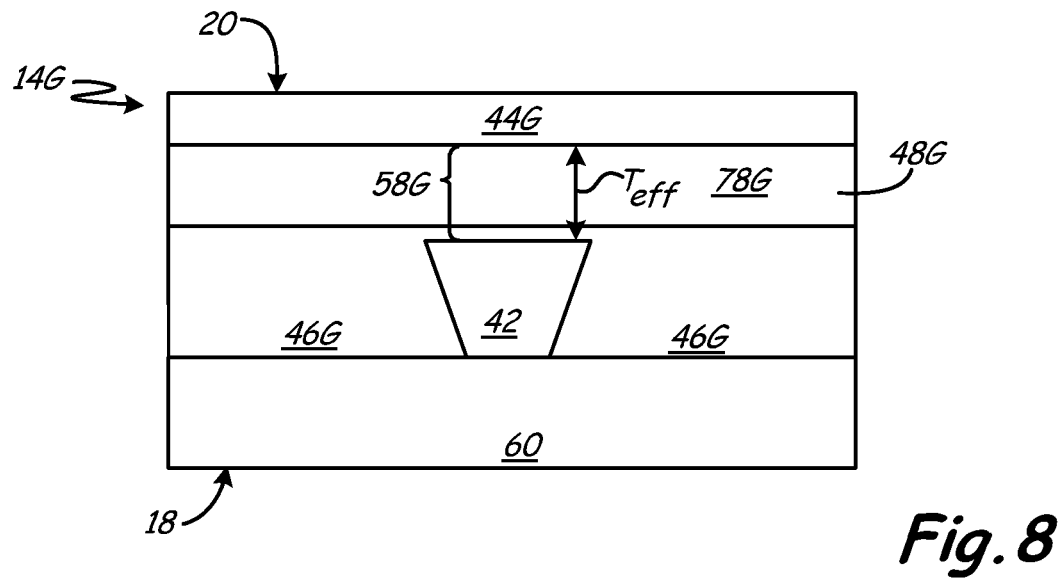
FIG. 8 is a medium facing surface view of a shielded write pole having a synthesized low magnetization shield comprising a low saturation magnetization material portion.

In a further embodiment, low magnetization shield 48 comprises a plurality of shims that are not insulated from one another. Instead, the shims are adjacent one another such that there are no intervening layers between each write shim and synthesized low magnetization shield 48 is graded. FIG. 8 illustrates a medium facing surface view of writer 14G having graded synthesized low magnetization shield 48G. Shielded writer 14G includes substrate 60, write pole tip 42, first write gap 46G, synthesized low magnetization shield 48G and trailing shield 44G. Substrate 60, write pole tip 42, first write gap 46G and trailing shield 44G are similar to those described above with respect to FIG. 2.

Effective gap 58G is formed between write pole tip 42G and trailing shield 44G, and has effective thickness $T_{eff}$. First write gap 46G and synthesized low magnetization shield 48G are positioned in effective gap 58G. Synthesized low magnetization shield 48G comprises low saturation magnetization material or saturable material portion 78G. In one example, low saturation magnetization material portion 78G is graded such that the magnetic saturation value decreases with increasing distance from write pole tip 42. In another example, low saturation magnetization material portion 78G comprises a saturable material. A saturable material can only develop a given amount of magnetization and will draw less flux from write pole tip 42 because it saturates.

The geometry of synthesized low magnetization shield 48G can be tuned to reshape the potential distribution of synthesized low magnetization shield 48G and trailing shield 44G so that flux is distributed between shield 48G and shield 44G. In one example, synthesized low magnetization shield 48G is configured so that the effective field gradient, such as the Stoner-Wolfarth field gradient, decreases at a field value of between about 70% and about 60%, about 60% and about 50%, or about 50% and about 40% of the field maximum.

Synthesized low magnetization shield 48G has a low effective magnetic saturation value, where the effective magnetic saturation value of synthesized low magnetization shield 48G is equal to the average local magnetic saturation values along the thickness of low saturation magnetization material portion 78G. In one example, synthesized low magnetization shield 48G has an effective magnetic saturation value of less than 1.0 tesla, such as 0.9 tesla or less, 0.8 tesla or less or 0.7 tesla or less.

Figure 9:
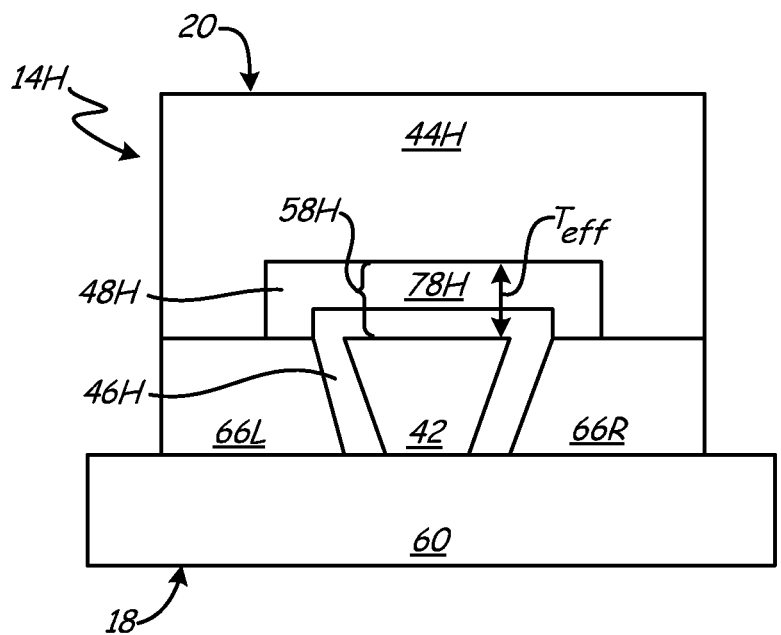
FIG. 9 is a medium facing surface view of a side-shielded write pole having a synthesized low magnetization shield comprising a low saturation magnetization material portion.
Figure 10:
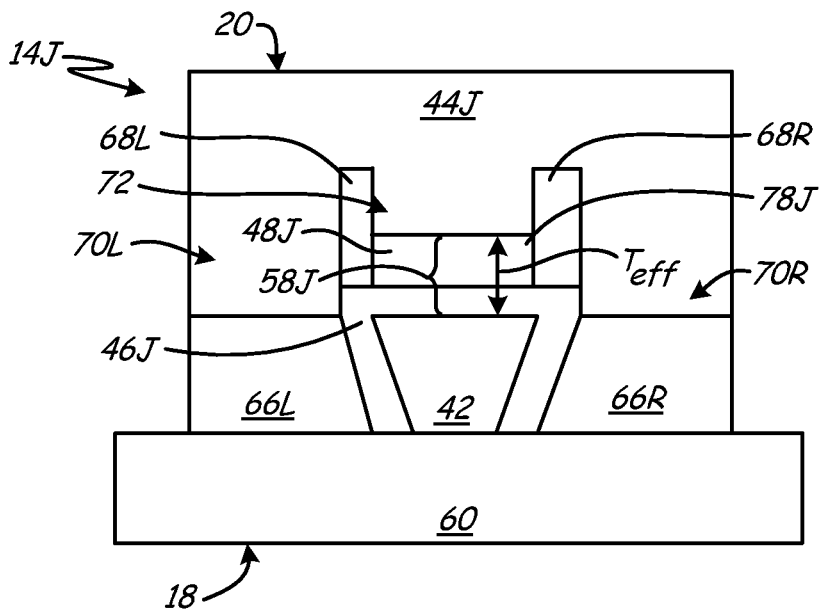
FIG. 10 is a medium facing surface view of a notched write pole having a synthesized low magnetization shield comprising a low saturation magnetization material portion.

In further embodiments, the writer can have side shields 66L and 66R as illustrated in writer 14H of FIG. 9 or the writer can have a notched configuration as illustrated in writer 14J of FIG. 10. Synthesized low magnetization shield 48H of writer 14H and synthesized low magnetization shield 48J of writer 14J are similar to synthesized low magnetization shield 48G. Synthesized low magnetization shield 48H comprises low saturation magnetization material portion 78H in effective gap 58H, and synthesized low magnetization shield 48J comprises low saturation magnetization material portion 78J in effective gap 58J. Low saturation magnetization material portion 78H and low saturation magnetization material portion 78J can be graded or can comprise a saturable material.

Figure 11:
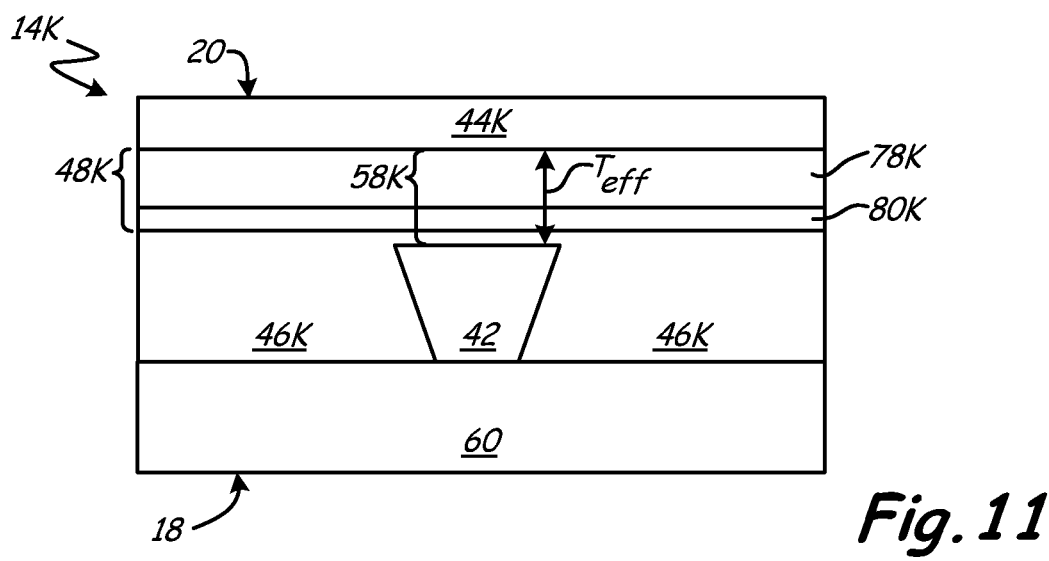
FIG. 11 is a medium facing surface view of a shielded write pole having a synthesized low magnetization shield comprising a saturation magnetization magnetic material portion and a high saturation magnetization material portion.

In a further embodiment, synthesized low magnetization shield 48 comprises a high saturation magnetization material located at leading edge 18 of low saturation magnetization material 78. FIG. 11 is a medium facing surface view of example writer 14K. Writer 14K has a shielded configuration and includes substrate 60, write pole tip 42, first write gap 46K, synthesized low magnetization shield 48K (having low saturation magnetization portion 78K and high saturation magnetization portion 80K) and trailing shield 44K. Substrate 60, write pole tip 42, first write gap 46K and trailing shield 44K are similar to those described above with respect to FIG. 2.

Effective gap 58K is formed between trailing edge 20 of write pole tip 42 and leading edge 18 of trailing shield 44K, and has effective thickness $T_{eff}$. First write gap 46K and synthesized low magnetization shield 48K are positioned in effective gap 58K. Synthesized low magnetization shield 48K includes low saturation magnetization material portion 78K and high saturation magnetization portion 80K. Low saturation magnetization portion 78K comprises a magnetic material and has a low effective magnetic saturation value. In one example, low saturation magnetization portion 78K has an effective magnetic saturation value between about 0.5 tesla and about 1.6 tesla. In another example, low saturation magnetization portion 78K has an effective magnetic saturation value between about 0.5 tesla and about 0.9 tesla. Low saturation magnetization portion 78K can be graded and comprise a plurality of adjacent one another and arranged in decreasing saturation value order from write pole tip 42. Grading low saturation magnetization portion 78K provides additional parameters to adjust when tuning synthesized low magnetization shield 48K. Alternatively or additionally, low saturation magnetization portion 78K can be a saturable material such that low magnetization shield 48K can only develop a set level of magnetization.

High saturation magnetization portion 80K also comprises a magnetic material. High saturation magnetization portion 80K has a high magnetic saturation value, such as between about 1.6 tesla and about 2.4 tesla. In another example, high saturation magnetization portion 80K has a magnetic saturation value between about 2.0 tesla and about 2.4 tesla. High saturation magnetization portion 80K has a small thickness compared to effective thickness $T_{eff}$ of effective gap 58K. In one example, high saturation magnetization material portion 80K is less than about 70%, 60%, 50%, 40% or 30% of effective thickness $T_{eff}$ of effective gap 58K.

At least partially because of the small thickness of high saturation magnetization portion 80K, synthesized low magnetization shield 48K has a low effective magnetic saturation value, where the effective magnetic saturation value of synthesized low magnetization shield 48K is that average local magnetization values along the thickness of shield 48K. In one example, synthesized low magnetization shield 48K has an effective magnetic saturation value of less than 1.0 tesla, such as 0.9 tesla or less, 0.8 tesla or less or 0.7 tesla or less.

Synthesized low magnetization shield 48K is configured to produce a high gradient through the write window and a low gradient down-track of the write window. In one example, synthesized low magnetization shield 48K is configured so that the effective field gradient, such as the Stoner-Walfarth field gradient, decreases at a field value of between about 70% and about 60%, about 60% and about 50%, or about 50% and about 40% of the field maximum. Producing a low gradient down-track of the write window draws less flux from write pole tip 42 and increases the peak achievable field, while not affecting the writing capabilities of writer 14K.

Figure 12:
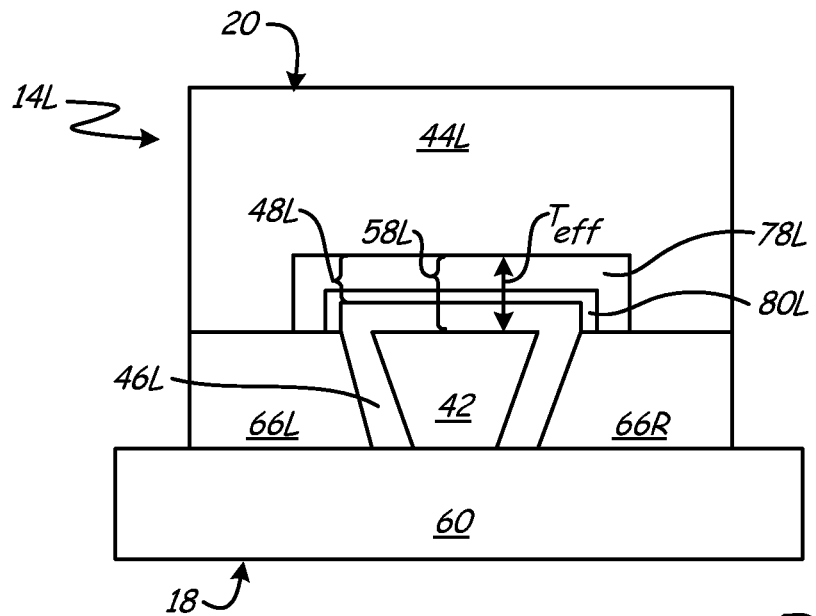
FIG. 12 is a medium facing surface view of a side-shielded write pole having a synthesized low magnetization shield comprising a low saturation magnetization material portion and a high saturation magnetization material portion.
Figure 13:
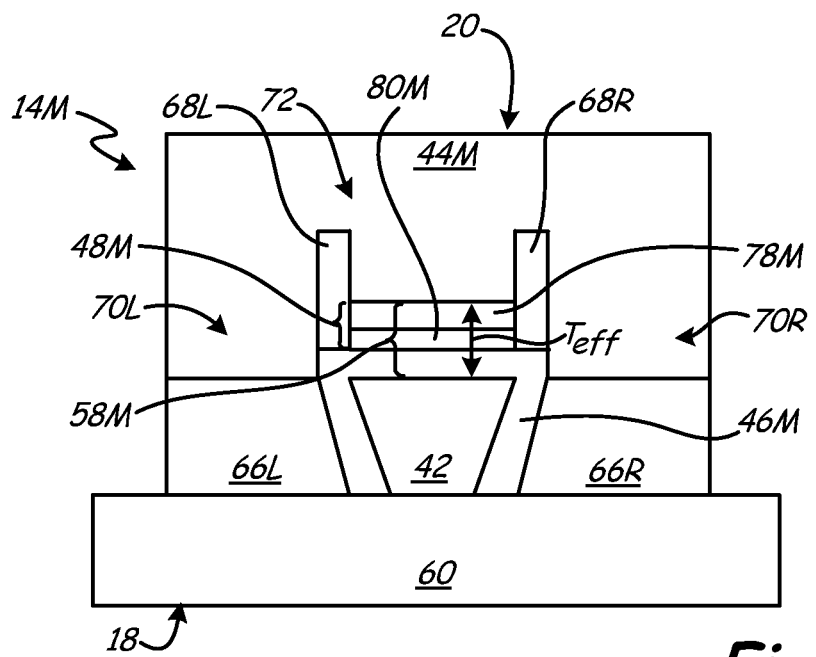
FIG. 13 is a medium facing surface view of a notched write pole having a synthesized low magnetization shield comprising a low saturation magnetization material portion and a high saturation magnetization material portion.

In further embodiments, the writer can have side shields 66L and 66R as illustrated in writer 14L of FIG. 12 or the writer can have a notched configuration as illustrated in writer 14M of FIG. 13. Synthesized low magnetization shield 48L of side-shielded writer 14L is similar to synthesized low magnetization shield 48K of FIG. 11 and comprises low saturation magnetization material 78L and high saturation magnetization material 80L. Similarly, synthesized low magnetization shield 48M of notched writer 14M comprises high saturation magnetization material 80M and low saturation magnetization material portion 78M in effective gap 58M.

The present invention is more particularly described in the following examples that are intended as illustrations only, since numerous modifications and variations within the scope of the present invention will be apparent to those skilled in the art.

Figure 14:
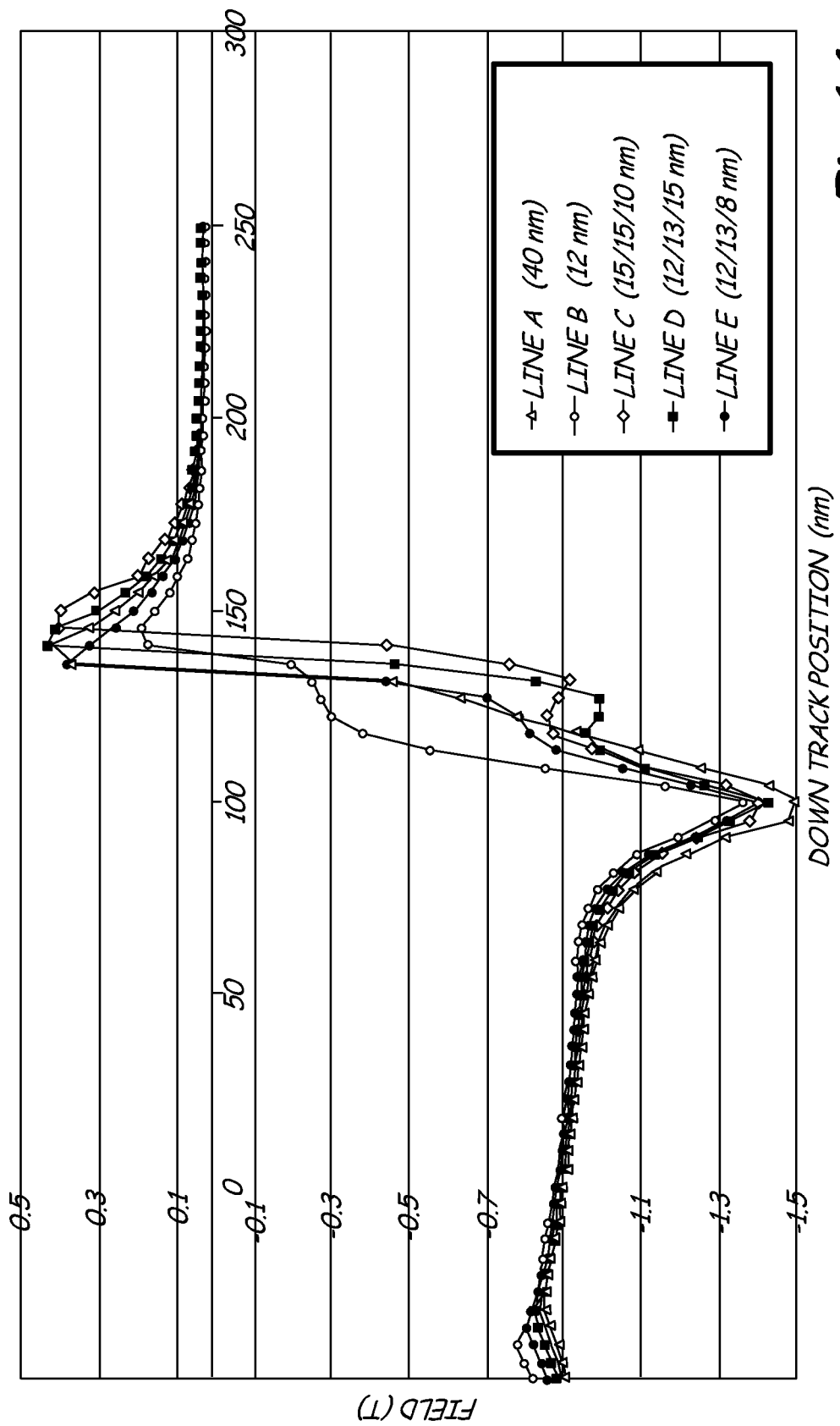
FIG. 14 illustrates simulated field profiles of a series of writer configurations.

A series of writer configurations were modeled and compared. FIG. 14 compares the field of notched writers having one write gap and the field of notched writers having two write gaps and a first shim (similar to writer 14C of FIG. 4), where the thickness of the write gaps are varied. In a notched writer having one write gap, first write gap 46 entirely occupies the space between trailing edge 20 of write pole tip 42 and leading edge 18 of trailing shield. All writers modeled in FIG. 14 had a write pole tip width (TPW) of about 40 nm. Line A and Line B represent notched writers having one write gap, and Line C, Line D and Line E represent notched writers having two write gaps and a first shim. The configuration of each writer is presented in TABLE 1.

TABLE 1

Configurations of writers of FIG. 14

| Writer | First write gap thickness | First shim thickness | Second write gap thickness |
|---|---|---|---|
| Line A | 40 nm | n/a | n/a |
| Line B | 12 nm | n/a | n/a |
| Line C | 15 nm | 15 nm | 10 nm |
| Line D | 12 nm | 13 nm | 15 nm |
| Line E | 12 nm | 13 nm | 8 nm |

FIG. 14 plots the field in tesla versus the down-track position in nanometers. For Line A, the writer comprised one write gap having a thickness of 40 nm. For Line B, the thickness of the write gap was reduced to 12 nm. The results indicate that reducing the thickness of the write gap from 40 nm to 12 nm improves the effective field. However, decreasing the thickness of the write gap reduced the field by about 9%.

Line C, Line D and Line E represent the results of notched writers having two write gaps and a first shim. Comparing Lines C to E to Lines A and B illustrates that introducing a first shim and a second write gap allows a similar field gradient at higher field values. Further, the second write gap and the shim minimize the field loss to about 4%.

Figure 15:
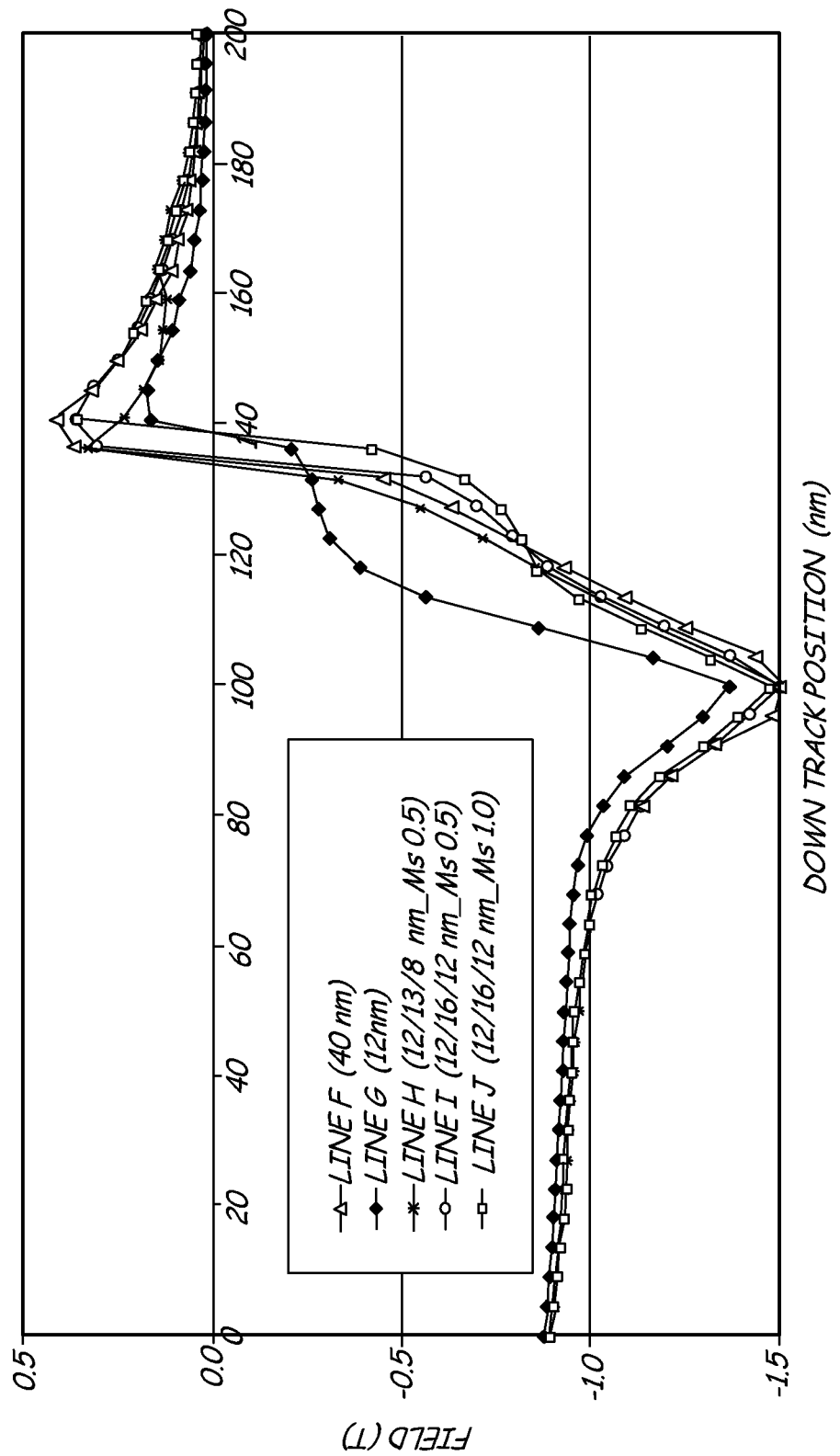
FIG. 15 illustrates simulated field profiles of another series of writer configurations.

FIG. 15 compares the fields of another set of writers. All the writers of FIG. 15 had a TPW of about 40 nm. Line F and Line G represent writers having one write gap and Line H, Line I and Line J represent writers having a first write gap, a first shim and a second write gap. The configurations of the writers of FIG. 15 are provided in TABLE 2.

TABLE 2

Configuration of writers of FIG. 15.

| Writer | First write gap thickness | First shim thickness | Moment of first shim | Second write gap thickness |
|---|---|---|---|---|
| Line F | 40 nm | n/a | n/a | n/a |
| Line G | 12 nm | n/a | n/a | n/a |
| Line H | 12 nm | 13 nm | 0.5 | 8 nm |
| Line I | 12 nm | 16 nm | 0.5 | 12 nm |
| Line J | 12 nm | 16 nm | 1.0 | 12 nm |

The moment and thickness of the first shim was varied for Line H through Line J to tune the inflection point in the media. Comparing Line H to Line I illustrates the effect of changing the thickness of the first shim and the second write gap. For Line H, the shim was 13 nm long with a moment of 0.5 and the second write gap was 8 nm long; for Line I, the first shim was 16 nm long with a moment of 0.5 and the second write gap was 12 nm long.

Comparing Line I to Line J illustrates the effect of changing the moment of the first shim. For Line J, the first shim was 16 nm long with a moment of 1.0. Increasing the moment of the first shim moved the inflection point from a field value of 0.5 T for Line I to a field value of 0.7 T for Line J. Further, similar to FIG. 14, comparing Lines H through J to Line F and Line G illustrates that the first shim and the second write gap improve the field gradient without significant loss of field.

Although the present disclosure has been described with reference to an exemplary embodiment(s), it will be understood by those skilled in the art that various changes may be made and equivalents may be substituted for elements thereof without departing from the scope of the invention. For example, magnetic medium 50 can be any type of medium that can be used in conjunction with recording head 10, such as composite media, continuous/granular coupled (CGC) media, discrete track media, and bit-patterned media. Further, reader 12 and writer 14 also are shown merely for purposes of illustrating a construction that may be used in a recording head 10 and variations on the designs may be made. For example, a dual return pole writer configuration may be provided on writer 14 instead of the shown single pole writer configuration. In addition, many modifications may be made to adapt a particular situation or material to the teachings of the various embodiments without departing from the essential scope thereof. Therefore, it is intended that the present technology not be limited to the particular embodiment(s) disclosed, but that the disclosure will include all embodiments falling within the scope of the appended claims.

The invention claimed is:

1. A magnetic writer comprising:
   a write pole proximate an air bearing surface (ABS); and
   a trailing shield separated from the write pole by a write gap coupled to a synthesized magnetic shield having a negative magnetic potential while the write pole has a positive magnetic potential.

2. The magnetic writer of claim 1, wherein the synthesized magnetic shield has a thickness less than about 70% of an effective thickness of the write gap.

3. The magnetic writer of claim 2, wherein the thickness of the synthesized magnetic shield is less than about 40% of the effective thickness of the write gap.

4. The magnetic writer of claim 1, wherein the trailing shield further comprises a magnetic layer disposed between the write gap and the trailing shield.

5. The magnetic writer of claim 1, wherein the trailing shield has a tongue, a first trailing side shield and a second trailing side shield, a first notch separates the first trailing side shield and the tongue while a second notch separates the second trailing side shield and the tongue, the first trailing magnetic side shield and write gap positioned solely on the tongue.

6. The magnetic writer of claim 1, wherein the synthesized magnetic shield and write gap collectively have an average magnetic saturation of 0.9 tesla or less.

7. The magnetic writer of claim 1, wherein the synthesized magnetic shield and write gap collectively have an average magnetic saturation of 0.7 tesla or less.

8. The magnetic writer of claim 1, and further comprising:
   a first side shield located along a first side of the write pole; and
   a second side shield located along a second side of the write pole, opposite the first side.

9. The magnetic writer of claim 1, wherein the trailing shield comprises a plurality of write shims having different magnetizations and arranged so that the magnetization decreases with increasing distance from the write pole tip.

10. The magnetic writer of claim 9, wherein a first write shim contacts a second write shim in the plurality of write shims.

11. The magnetic writer of claim 1, wherein the trailing shield is configured so that an effective field gradient decreases at a field value of between about 70% and about 60% of a field maximum.

12. A magnetic writer comprising:
   a write pole proximate an air bearing surface (ABS);
   a trailing shield having a first magnetization component and spaced from the write pole on the ABS by a synthesized magnetic shield and a write gap, the synthesized magnetic shield having a negative magnetic potential while the write pole has a positive magnetic potential and a second magnetization component perpendicular to the first magnetization direction.

13. The magnetic writer of claim 12, wherein the write gap comprises a weak magnetic material.

14. The magnetic writer of claim 13, wherein the write gap material has a magnetic saturation between about 1.6 and 0.5 tesla and the synthesized magnetic shield has a magnetic saturation between about 2.0 and 2.4 tesla.

15. The magnetic writer of claim 13, wherein the write gap material has a magnetic saturation between about 0.9 and 0.5 tesla and the synthesized magnetic shield has a magnetic saturation between about 1.6 and 2.4 tesla.

16. A magnetic recording head comprising:
   a write pole separated from a trailing shield by an effective gap, wherein the effective gap comprises:
      a synthesized magnetic shield separated from the write pole by a first write gap, the synthesized magnetic shield having a first shim and second write gap to provide a negative magnetic potential while the write pole has a positive magnetic potential.

17. The magnetic recording head of claim 16, wherein a second shim is disposed between the second write gap and the synthesized magnetic shield.

18. The magnetic recording head of claim 16, wherein the synthesized magnetic shield has a first thickness and the effective gap has a second thickness, the first thickness being less than 40% of the second thickness.

19. The magnetic recording head of claim 16, wherein the effective gap has an average magnetic saturation of less than about 0.9 tesla.

20. The magnetic recording head of claim 17, wherein the first shim has a magnetic saturation between about 1.6 and 2.4 tesla and the second shim has a magnetic saturation between about 0.5 and 1.6 tesla.

* * * * *